Oct. 4, 1938.    R. K. SUPER    2,131,906
BRAKE DRUM
Filed May 18, 1935
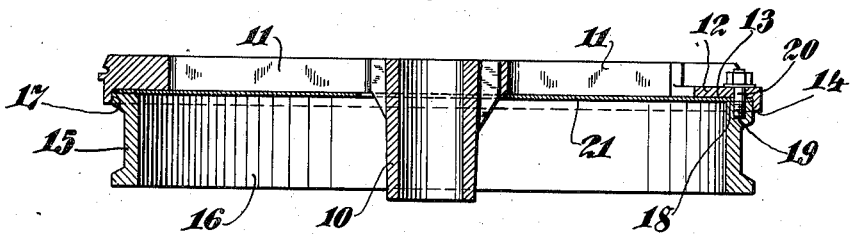
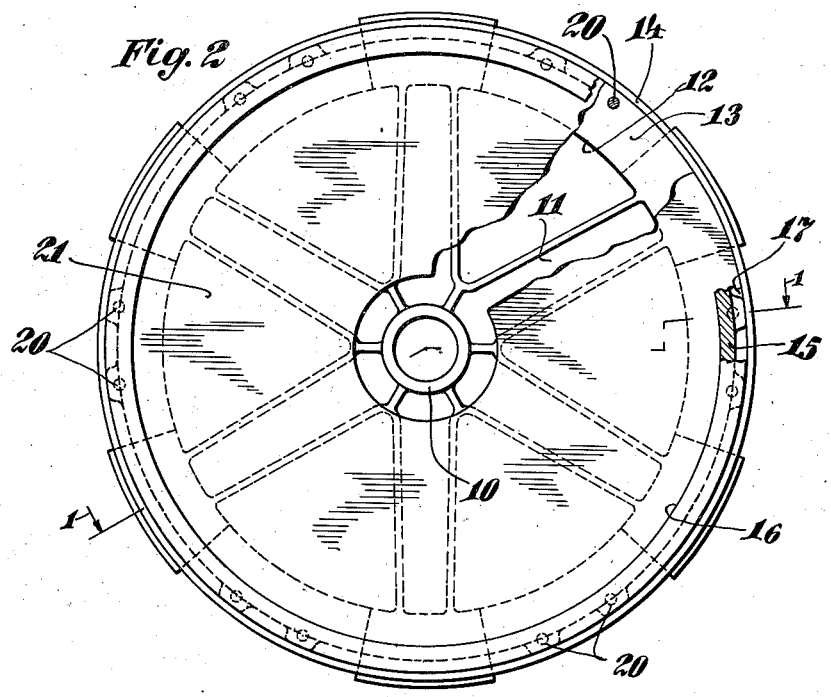
INVENTOR.
Ralph K. Super,
Hoguet, Neary & Campbell,
HIS ATTORNEYS Patented Oct. 4, 1938

2,131,906

UNITED STATES PATENT OFFICE 2,131,906

BRAKE DRUM

Ralph K. Super, Allentown, Pa., assignor to Mack Manufacturing Corporation, a corporation of Delaware Application May 18, 1935, Serial No. 22,188

1 Claim. (Cl. 188—218)

The present invention relates to brake drums and embodies, more specifically, an improved brake drum construction which is adapted particularly for use in connection with vehicle wheels, the improved construction resulting in a great simplification in the manufacturing operations involved in the production thereof, as well as a decrease in weight and consequent cost of materials.

The conventional form of brake drum now in use is the so-called dishpan type of drum in which the cylindrical drum portion is formed with a bolting flange disc which extends inwardly radially and is adapted to lie against a flange formed with and between the wheel spokes.

This type of drum is heavy and the foundry operations necessary in casting the same are unnecessarily difficult. Moreover, the scrap weight of the worn out drum is substantial and incentive thus arises to use liners and other schemes for rehabilitating the worn out drums.

In accordance with the present invention, it is proposed to provide a construction which is of relatively light weight and is easily manufactured, the foundry operations incident to the casting thereof being simple and resulting in a drum, the scrap weight of which when worn out is much less than that of the dishpan type of drum. In fact, the scrap weight of the new drum is so little as to offer no incentive to use liners or other rehabilitating schemes.

A further object of the invention resides in the provision of a brake drum formed with a straight through bore which will thus enable it to be machined readily and be maintained in perfect balance.

Further objects of the invention will be apparent as it is described in connection with the accompanying drawing, wherein Figure 1 is a view in transverse section, taken on the broken line 1—1 of Figure 2, and looking in the direction of the arrows; and Figure 2 is an end view of a brake drum constructed in accordance with the present invention.

Referring to the above drawing, the wheel is shown as being formed with a hub 10 and radially extending spokes 11. These spokes form a spider having, at its outer periphery, a drum supporting annulus 12 which is formed with a machined face 13 and a cylindrical pilot flange 14.

The brake drum is shown at 15 with a central straight through bore 16 and a pilot flange 17 which is adapted to engage the flange 14 and accurately maintain concentricity and provide rigidity. The end 18 of the drum 15 is machined and formed with stud holes 19 within which studs 20 are received. By reason of the uninterrupted cylindrical periphery of the pilot flange on the drum, there is no predetermined or fixed position of the drum with respect to the flange on the spider insofar as angular position is concerned. The studs 20 are carried by the supporting member 12 and thus absorb all torque reactions on the drum. To prevent thread collapse where cast iron is used as the brake drum material studs are preferably used instead of cap screws.

Inasmuch as the radial flange of the old dishpan type of brake drum has been eliminated, the openings between the spokes afford access to the brake mechanism and permit air circulation. Where excesses of foreign material enter these openings, the structure may be enclosed by providing a sheet metal dust shield 21 which may be received within the flange 14 and positioned between the drum 15 and the supporting member 12. In this fashion, the advantages of an enclosed brake drum and brake mechanism are achieved, at the same time effecting a great saving in weight and ease of manufacture. There is no duplication of parts in the wheel spider assembly, as exists in conventional mechanisms and the resultant reduction in weight and manufacturing cost of the wearing part of the brake drum thus minimizes the cost of replacement and permits the construction to compete successfully with brake drum relining processes which are now followed.

Inasmuch as the stud mounted drum is a simple ring on the outside of which the usual ventilating flanges (not shown) may be formed, the casting is much lighter and the foundry operations in manufacturing the same are quite simple. The scrap weight of the drum, when worn out, is much less than that of the dishpan type of drum and does not offer an incentive to the use of liners and other rehabilitating methods. Inasmuch as the drum is formed with a straight through bore, the machining operations thereon are more easily performed and the drum may thus be kept in perfect balance. Due to the symmetrical shape of the stud mounted drum, it is possible to get more homogeneous castings, and thus a better quality of material in the drum.

While the invention has been described in connection with the specific construction shown in the accompanying drawing, it is not to be limited save as defined in the appended claim.

I claim:

A brake drum and support comprising a spider, an annular support on the spider having a machined face lying in a plane perpendicular to the axis of the drum, a brake drum having a straight bore through, a machined face on one end of the drum lying in a plane perpendicular to the axis of the drum, a pilot flange on the drum having an uninterrupted machined face, a mating flange on the spider to mate with and locate the pilot flange to center the drum in any angular position of the drum with respect to the spider, and means to secure the drum to the spider with the flanges thereof in contiguous relationship.

RALPH K. SUPER.